Figure 1:
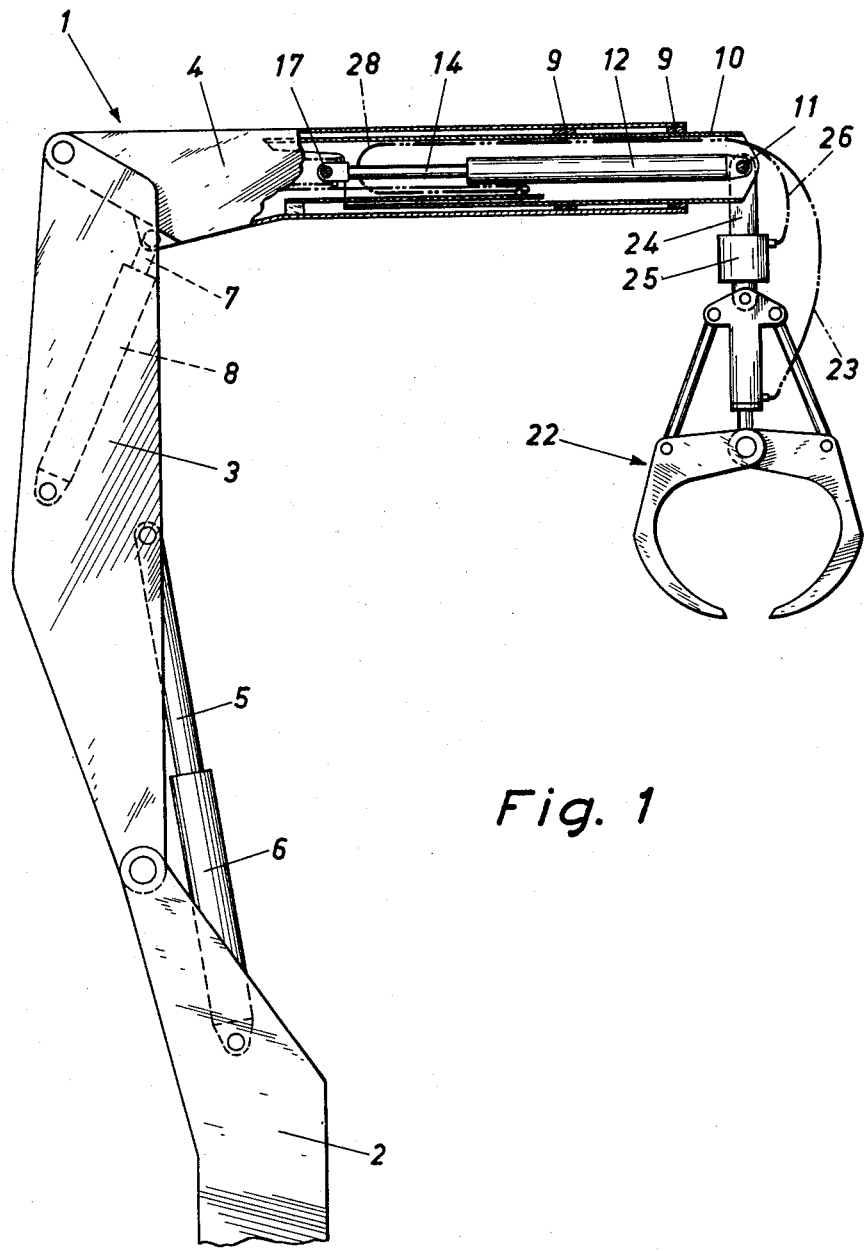

Oct. 26, 1965     I. NILSSON     3,214,033
HYDRAULIC LINE CONFIGURATION FOR EXTENSIBLE MEMBERS
Filed July 5, 1963     3 Sheets-Sheet 1

INVENTOR.

BY *Ingemar Nilsson*

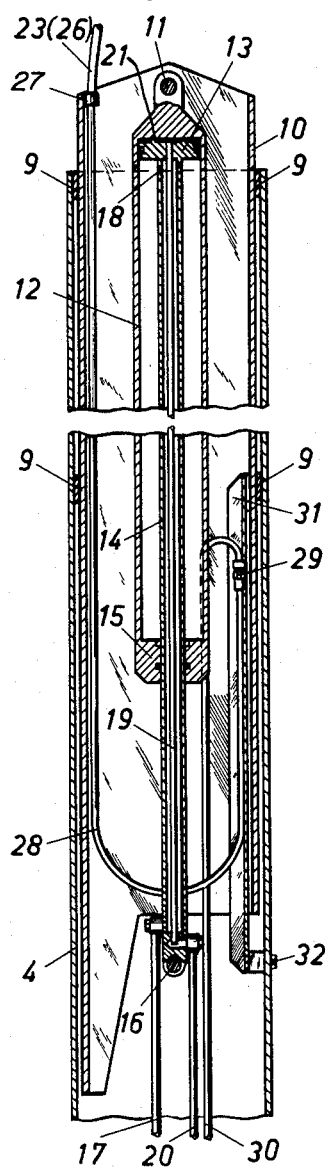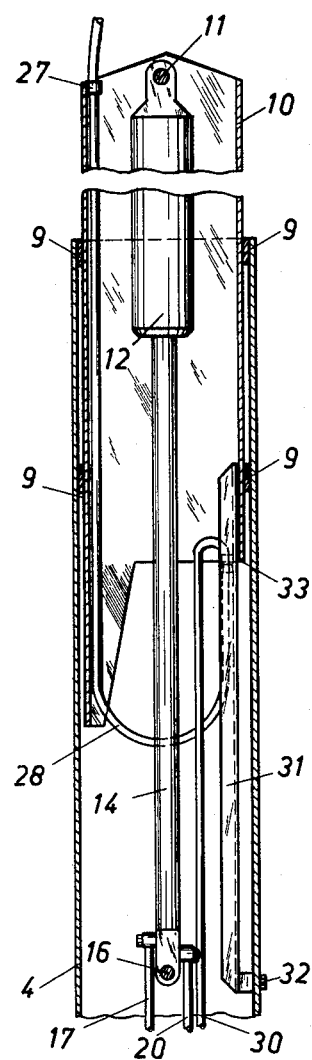

Oct. 26, 1965    I. NILSSON    3,214,033
HYDRAULIC LINE CONFIGURATION FOR EXTENSIBLE MEMBERS
Filed July 5, 1963    3 Sheets-Sheet 3

INVENTOR.

BY *Ingemar Nilsson*

United States Patent Office 3,214,033
Patented Oct. 26, 1965

3,214,033
HYDRAULIC LINE CONFIGURATION FOR
EXTENSIBLE MEMBERS
Ingemar Nilsson, Hudiksvall, Sweden, assignor to Hydrauliska Industri Aktiebolaget, Hudiksvall, Sweden, a corporation of Sweden
Filed July 5, 1963, Ser. No. 293,589
Claims priority, application Sweden, July 5, 1962, 7,508/62
7 Claims. (Cl. 212—55)

The present invention has reference to cranes with a swingable hoisting arm, the latter comprising an hydraulically driven loading beam with an extension portion which is axially displaceable in an arm portion by means of an hydraulic cylinder with a piston movable therein. The loading apparatus can comprise a catcher, which might be turnable by means of an hydraulic motor, e.g. a so-called rotator. The flexible, hydraulic pressure medium conduits or hoses are as a rule arranged on the outside of the hoisting arm and should be bent in large loops in such a way that there is obtained a sufficient length on the hoses for the protrusion of the extensible portion without a break of the hoses. Naturally, these loops require a great deal of space and they easily catch on tree branches when a tractor or a lorry with a crane of the recited kind is driving through a wood. So as to eliminate these drawbacks attempts have been made to arrange the flexible hoses in the interior of the hoisting arm. However, this involves a risk for a clamping and tearing off of the hoses by means of the extension portion when this is moved into the arm portion as well as serious wearing of the hoses due to the friction against the sides of the arm portion.

The present invention has for its purpose to eliminate all the above recited drawbacks. The main feature of the invention is to be seen therein that flexible pressure medium conduits, extending to the loading means, come from a connection in the interior of the arm portion situated within the movement range of the extension portion and in that the conduits extend from this connection place first rearwards and thereupon are laid in a loop or an arch forwards to the loading means. Due to the fact that the hoses extend along an arch rearwards from the connection place it is rendered possible to arrange them on a suitable distance from the inner border of the extension portion and thus prevent them to be torn or damaged during the displacement of the extension portion.

According to a preferred embodiment of the invention the connection is situated at the free end of a carrying rail which extends from the arm portion freely into the inner end of the extension portion. This carrying rail, which preferably comprises a channel-steel with the branches directed downwards, simultaneously serves as a guide for the hoses at the derolling of the hose loop at the displacement of the extension portion in and out of the arm portion.

Figure 4:
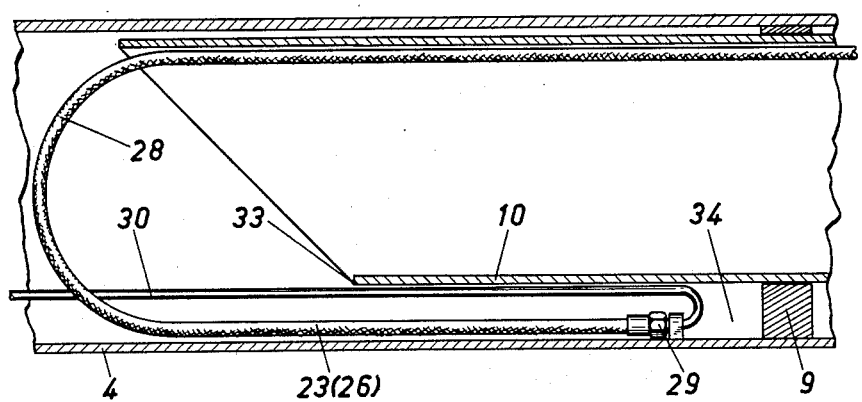
Figure 5:
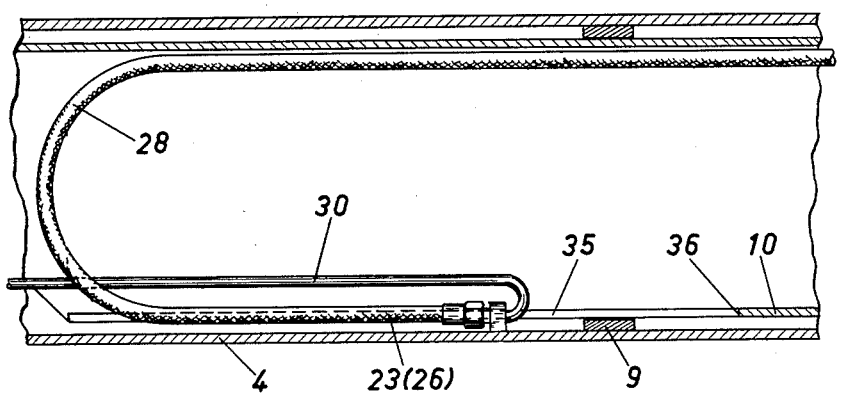

An example of a device in accordance with the invention will now be described with reference to the accompanying, partly diagrammatic drawings. In the drawings:

FIG. 1 is a longitudinally partly cut side elevation of the upper portion of a crane provided with a device improved in accordance with the invention, FIG. 2 shows on an enlarged scale a longitudinal section through the outer end of the hoisting arm with the extension portion in its inner position, FIG. 3 shows a similar longitudinal section with the extension portion in the outer position, FIG. 4 shows a longitudinal section through the hoisting arm at the connection according to another embodiment of the invention, and FIG. 5 shows a similar section but according to a still further embodiment of the invention.

As shown in FIG. 1 the crane shown in the drawings has a hoisting arm 1 comprising an inner arm portion 3 pivoted on one end of the crane post 2 and an outer arm portion journalled on the outer end of said inner arm portion 3. The arm portions 3, 4 are swingable in the vertical plane by means of two hydraulic cylinders having piston movable therein 5, 6 and 7, 8, respectively. The arm portion 4 which preferably has a box-shaped cross section is on its outer end provided with internal abutments 9 which serve as guides for an extension portion 10 which preferably also is box-shaped and axially displaceable in the arm portion 4. The displacement is effected by means of an hydraulic cylinder 12 attached with its outer end by means of a bolt 11, a piston 13 being axially movable in said cylinder 12 and having a piston rod 14 extending through the inner end 15 of the cylinder 12. The inner end of the piston rod 14 is by means of a bolt 16 attached to the arm portion 4. The piston rod 14 comprises a tube which at the inner end is attached to a conduit 17 for pressure medium, said tube at the opposite end being provided with ports 18 for the pressure medium opening into the cylinder 12. A smaller tube 19 extends axially through the piston rod 14, said tube 19 at the inner end being connected to another pressure medium conduit 20 which at the opposite end passes through the piston 13 and opens in the cylinder chamber 21.

As obvious from the aforegoing the hydraulic cylinder 12 with the piston 14 is double acting. When the pressure medium is fed through the conduit 20 and the tube 19 to the cylinder chamber 21, the cylinder 12 is moved with the extension portion 10 outwards (to the right according to FIG. 1) simultaneously as the pressure medium is forced out of the cylinder chamber on the left hand side of the piston 13 and out through the ports 18 through the piston rod 14 and the conduit 17. When the extension arm 10 is to be pushed axially into the arm portion 4, the pressure medium is of course pressed in a direction opposite to the above described direction.

The extension part 10 carries on its outer end a loading means which according to FIG. 1 comprises an hydraulically controlled catcher 22. The flexible conduit such as a flexible hose for the hydraulic medium which makes it possible to control the catcher has been denoted with 23. For the turning of the catcher 22 about its vertical shaft 24 there is used an hydraulic motor, a so-called rotator 25. The flexible conduit such as a flexible hose for the pressure medium to the rotator 25 has been denoted 26. In case said control means comprises double acting hydraulic cylinders and pistons of course, double conduits 23, 26 must be arranged for these means. The hoses 23, 26 extend through an attachment 27 at the outer end of the extension portion and extend into the rear end of said portion where they in a great loop 28 again extend forwards to a connection 29 where pressure medium is fed from conduits 30 in the interior of the arm portion 4. The connection 29 is according to FIGS. 1–3 situated at the free end of a supporting rail 31 of channel section being at the opposite end attached by means of bolts 32 or the like in such a way that it extends freely into the extension portion 10.

As obvious especially from FIGS. 2 and 3 the hoses 23, 26 are well protected in the interior of the extension portion 10. As the hoses 23, 26 with their portions situated in the vicinity of the connection 29 is carried by the carrying rail 31 there is no risk that the inner border 33 of the extension portion 10 can damage the hoses. The movement of the hoses will be rather small and the loop 28 will move in both directions in a range which corresponds to half the length of movement of the extension portion 10. Due to the carrying rail 31 the arrangement of the hoses requires very little space and at the dimensioning of the hoisting arm one does not have to take into conisderation the arrangement of any necessary space for the hoses.

In the embodiment shown in FIG. 4 the internal abutments 9 have been made so high that the space 34 between the extension portion 10 and the arm portion 4 will be sufficient for housing the hoses 23, 26 as well as the conduit 30. The loop 28 must extend so far behind the border 33 on the extension portion 10 that this border during the movement of the extension portion inwards not will be brought in contact with the loop. At the dimensioning of the hoisting arm it must here be taken into consideration the space required for the hoses 23, 26 and the hoisting arm will thus be somewhat higher than in the embodiment shown in FIGS 1–3.

In the embodiment according to FIG. 5 the guiding abutments 9 have been given the same height as in the embodiment according to FIGS. 1–3 thereby that the extension portion 10 has been provided with a longtiudinal slot 35 and the pressure medium hoses 23, 26 as well as the conduit 30 extend through the slot 35. The slot 35 must have such a length that the outer edge of the slot during the displacement of the extension portion into the arm portion 4 never will come into contact with the arch 28 on the hoses 23 and 26.

The present invention has been described in detail above for purposes of illustration only and is not intended to be limited by this description or otherwise except as defined in the appended claims. Modifications can be carried out with regard to the controlled catcher 22 as well as in the devices for the swinging of the hoisting arm 1. The cylinder 12 can be attached to the arm portion 4 and the piston rod 14 instead be attached to the extension portion 10.

What I claim is:

1. In a crane, the combination of an extensible telescopic boom comprising a hollow cylindrical arm section, a hollow cylindrical extension section telescopically received in said arm section and longitudinally movable into and out of said arm section and having an outer end projecting from said arm section, and hydraulic means for moving said extension section longitudinally relative to said arm section, loading means carried by the outer end of said extension section, fluid pressure means outside said extension section for operating said loading means and means for supplying pressure fluid to said operating means comprising a connection fixed in the interior of said arm section within the range of movement of said extension section and a flexible conduit extending from said connection first inwardly inside said arm section and then outwardly through the inside of said hollow extension section to form a U-shaped loop, and thence outwardly through the outer end of said extension section and to said operating means, the side of said extension section adjacent said connection and at the inner end of said extension section being cut away to accommodate said loop.

2. The combination according to claim 1, further comprising means for securing said conduit to the outer end of said extension section.

3. The combination according to claim 1, in which a rigid supply conduit extends longitudinally inside said arm section to said connection.

4. The combination according to claim 3, in which said connection is inside said extension section.

5. The combination according to claim 4, in which a track of upwardly-opening channel section extends longitudinally inside said extension section in position to receive and guide a lower leg portion of said loop of said flexible conduit.

6. The combination according to claim 3, in which said extension section is of smaller cross section and is received inside said arm section with a space therebetween and in which said connection is located in a lower portion of said space.

7. The combination according to claim 6, in which said extension section is provided with a longitudinally extendng slot and in which said connection is located in registry with said slot.

References Cited by the Examiner

UNITED STATES PATENTS

| | | | |
|---|---|---|---|
| 2,791,293 | 5/57 | Schenkelberger | 187—9 |
| 2,911,111 | 11/59 | Grove | 212—55 |
| 2,976,109 | 3/61 | Hayter | 138—110 |
| 3,069,033 | 12/62 | Ferwerda | 214—141 |
| 3,072,272 | 1/63 | Howlett | 214—141 |
| 3,101,130 | 8/63 | Bianca | 187—9 |

SAMUEL F. COLEMAN, *Primary Examiner.*

ANDRES H. NIELSEN, *Examiner.*